(12) United States Patent
Pulliam

(10) Patent No.: US 8,944,741 B2
(45) Date of Patent: Feb. 3, 2015

(54) CONTAINER UTILITY SYSTEM

(75) Inventor: Robert C. Pulliam, Houston, TX (US)

(73) Assignee: Tubular Rail, Inc., Houston, TX (US)

( * ) Notice: Subject to any disclaimer, the term of this patent is extended or adjusted under 35 U.S.C. 154(b) by 855 days.

(21) Appl. No.: 12/531,733

(22) PCT Filed: Mar. 19, 2008

(86) PCT No.: PCT/US2008/057451
§ 371 (c)(1),
(2), (4) Date: Sep. 17, 2009

(87) PCT Pub. No.: WO2008/115966
PCT Pub. Date: Sep. 25, 2008

(65) Prior Publication Data
US 2010/0104407 A1    Apr. 29, 2010

Related U.S. Application Data

(60) Provisional application No. 60/895,507, filed on Mar. 19, 2007.

(51) Int. Cl.
*B65G 67/00*    (2006.01)
*B66C 17/20*    (2006.01)
(Continued)

(52) U.S. Cl.
CPC .............. *B66C 17/20* (2013.01); *B65G 63/004* (2013.01); *B66C 19/002* (2013.01)
USPC .......................................... 414/390; 414/467

(58) Field of Classification Search
CPC ...... A01G 23/095; B27B 25/02; F16H 19/06; B65G 39/09; B65G 39/12; B65G 47/261; B65G 13/06; B65G 13/08; B65G 13/11; B65G 43/08; B65G 1/0435; B65G 1/0407; B65G 1/06; B65G 1/1371; B65G 63/004; B65G 67/603; B65G 1/023; B65G 39/02; B65G 13/02; B65G 13/04; B66F 9/07; B66F 7/22; B66F 9/07563; B66F 9/06; G11B 15/6835; B61D 3/20; B61D 3/18; B60P 3/07; B60P 3/08; B60P 1/52; B60P 3/1033; B60P 3/1066; B60P 3/1075; B60P 3/122; B60P 1/6463; B64D 9/00; B65D 88/022; B65D 88/005; B65D 90/046; B63C 3/06; A61G 5/104; G01R 31/3648; H01L 21/68707; B66C 19/00; B66C 19/002; B63B 27/10; B63B 25/004; B63B 27/12; F27D 3/12; F27D 3/06; F27D 3/123; B61B 13/00; B61B 13/02; B61B 15/00; B61B 13/125; E01B 25/00; E01B 25/16; C03B 35/186; C23D 9/10; A63H 18/00
USPC ......... 414/278, 282, 353, 390, 467, 529, 533, 414/678, 679, 137.1, 139.9, 142.6, 154, 414/561; 198/618, 780, 781.01; 193/35 R; 104/135, 124, 125
See application file for complete search history.

(56) References Cited

U.S. PATENT DOCUMENTS 283,947 A  *  8/1883  Augspath ...................... 104/135
1,616,761 A  *  2/1927  Rose ............................. 104/135
(Continued)

FOREIGN PATENT DOCUMENTS

JP          05338756 A       12/1993
JP       2002-211737 A        7/2002

OTHER PUBLICATIONS

PCT Written Opinion and International Search Report dated Aug. 22, 2008 for Appl. No. PCT/US2008/057451; (8 p.).

*Primary Examiner* — Saul Rodriguez
*Assistant Examiner* — Glenn Myers
(74) *Attorney, Agent, or Firm* — Conley Rose, P.C.

(57) ABSTRACT

A transport system for moving containers comprises a plurality of elevated supports having powered rollers and a transport having rails engaging the powered rollers. The transport has a member(s) for supporting the containers and means for moving the transport over the elevated supports.

16 Claims, 7 Drawing Sheets

Fig. 1A

(51) Int. Cl.
    *B65G 63/00*    (2006.01)
    *B66C 19/00*    (2006.01)

(56) References Cited

U.S. PATENT DOCUMENTS

| | | | | |
|---|---|---|---|---|
| 2,652,785 | A | * | 9/1953 | Cox .............................. 105/29.1 |
| 3,010,409 | A | * | 11/1961 | De Good et al. .............. 104/135 |
| 3,163,124 | A | * | 12/1964 | Hendrix ........................ 104/135 |
| 3,282,377 | A | * | 11/1966 | Pfeiffer et al. .................. 182/36 |
| 3,294,252 | A | * | 12/1966 | Hosoi et al. ................... 212/312 |
| 3,393,784 | A | * | 7/1968 | Dohanyos ................... 193/35 R |
| 3,572,563 | A | * | 3/1971 | Oliver ............................ 414/514 |
| 3,972,427 | A | * | 8/1976 | Stanley et al. .............. 244/137.1 |
| 4,000,228 | A | * | 12/1976 | Chevakin et al. ............. 261/111 |
| 4,270,628 | A | * | 6/1981 | Anderson ...................... 212/261 |
| 4,564,100 | A | * | 1/1986 | Moon ....................... 198/341.07 |
| 4,619,359 | A | | 10/1986 | Kennedy, Jr. et al. |
| 4,715,766 | A | | 12/1987 | Gebhardt |
| 4,768,914 | A | * | 9/1988 | Sing .............................. 414/237 |
| 4,976,365 | A | * | 12/1990 | Seo ............................... 220/1.5 |
| 5,449,056 | A | * | 9/1995 | Ross ................................. 191/6 |
| 5,491,921 | A | * | 2/1996 | Allen ............................... 42/94 |
| 6,170,401 | B1 | * | 1/2001 | Miller et al. ....................... 104/9 |
| 6,269,941 | B1 | * | 8/2001 | Ueno ............................ 198/782 |
| 6,443,084 | B1 | * | 9/2002 | Berg et al. ................. 114/201 R |
| 6,695,561 | B2 | | 2/2004 | Barry |
| 6,698,584 | B1 | | 3/2004 | Ray |
| 6,755,633 | B2 | * | 6/2004 | Miller ............................. 425/64 |
| 6,976,599 | B1 | * | 12/2005 | Rivera et al. .................. 212/325 |
| 7,549,546 | B2 | * | 6/2009 | Charge-Kroll et al. ........ 212/271 |
| 7,762,760 | B2 | * | 7/2010 | Takehara et al. .............. 414/803 |
| 2001/0030108 | A1 | * | 10/2001 | Hansen ........................ 198/728 |
| 2002/0046677 | A1 | * | 4/2002 | Okubo et al. ................ 105/163.1 |
| 2006/0280580 | A1 | * | 12/2006 | Lutz ......................... 414/222.03 |

* cited by examiner

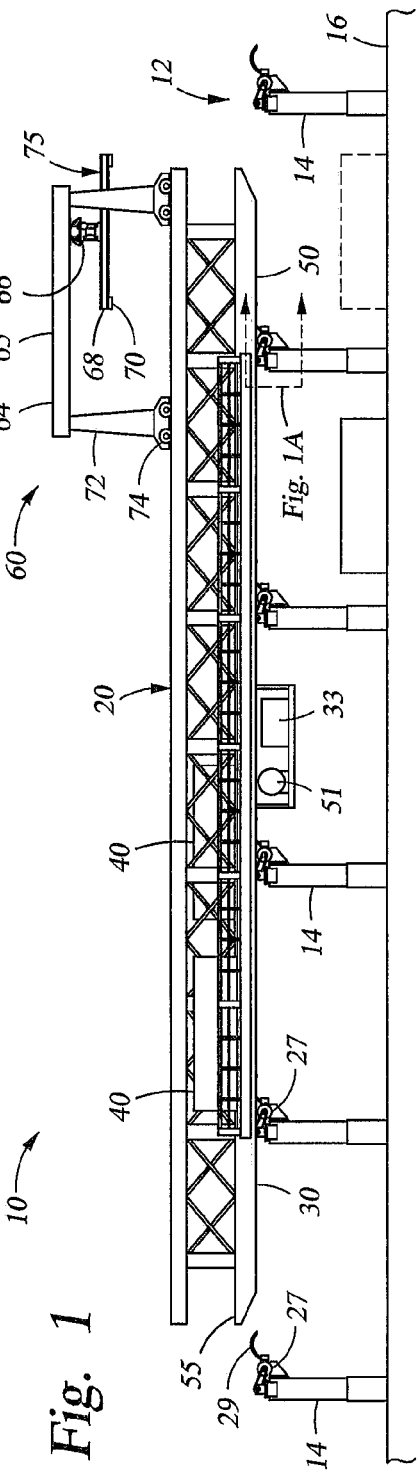
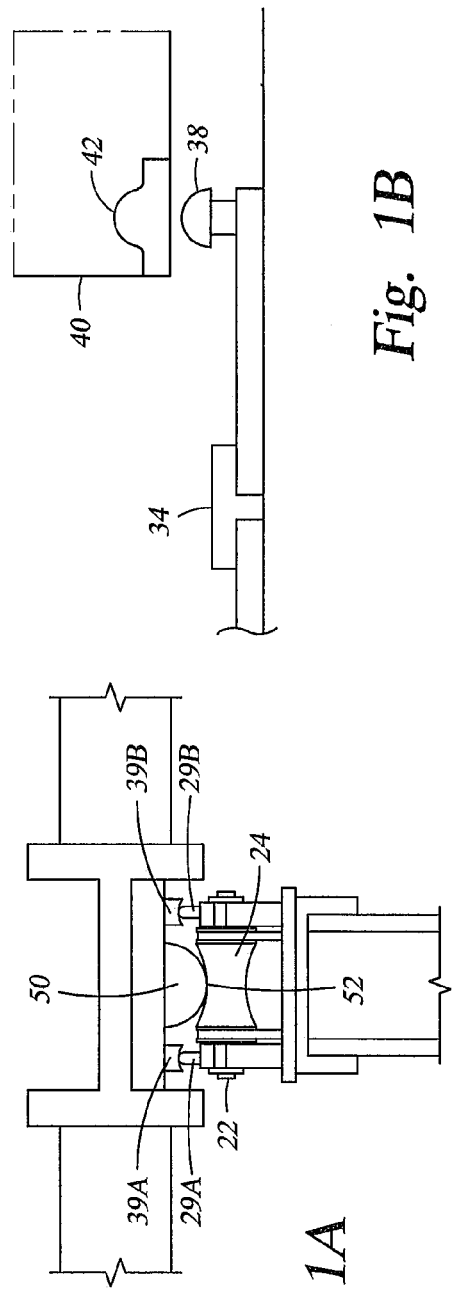
Fig. 1
Fig. 1A
Fig. 1B

CONTAINER UTILITY SYSTEM

BACKGROUND OF THE INVENTION

The present invention relates to apparatus and methods for transporting containers and more particularly to loading and unloading cargo containers between ships, trains and/or trucks at ports.

Cargo containers must be loaded and unloaded at large container ports. Often large cranes on tracks and wheels are used to load and unload cargo containers between ships and vehicles, such as trucks and trains. It is an objective to minimize any movement of the crane by accurately positioning the receiving vehicle underneath the crane for the loading and unloading of containers. Specific procedures have been developed in loading and unloading cargo containers so as to avoid moving such a crane. This has proven very difficult and thus time consuming. Oftentimes it is unsuccessful.

Additionally the movement of these containers away from the port is accomplished on an individual basis requiring one driver for each or at most two containers unless moved by train.

It is desirable to provide a system that avoids moving the crane and includes a vehicle capable of carrying multiple of containers; for example 50 twenty foot equivalents or 25 forty foot containers with a minimum of labor or pollution and further that the system actually decreases ground level congestion. Still further it would be desirable for the system to have the capability to self load/unload at a terminal or beyond.

The present invention overcomes the deficiencies of the prior art.

SUMMARY OF THE INVENTION

The present invention includes an apparatus and method to transport containers to and from various areas within and without modern container ports.

A transport system for moving containers comprises a plurality of elevated supports having powered rollers and a transport having rails engaging the powered rollers. The transport has a member(s) for supporting the containers and means for moving the transport over the elevated supports.

Other objects and advantages of the invention will appear from the following description.

BRIEF DESCRIPTION OF THE DRAWINGS

For a detailed description of the preferred embodiment of the invention, reference will now be made to the accompanying drawings wherein:

FIG. 1 is a side elevation view of the container utility system;

FIG. 1A is a detailed view of detail 1A shown in FIG. 1;

FIG. 1B is a detailed view of detail 1B shown in FIG. 1;

DESCRIPTION OF THE PREFERRED EMBODIMENTS

Referring initially to FIG. 1, there is shown the container utility system 10 including a skid or transport 20 supported on a support system 12.

Figure 3:
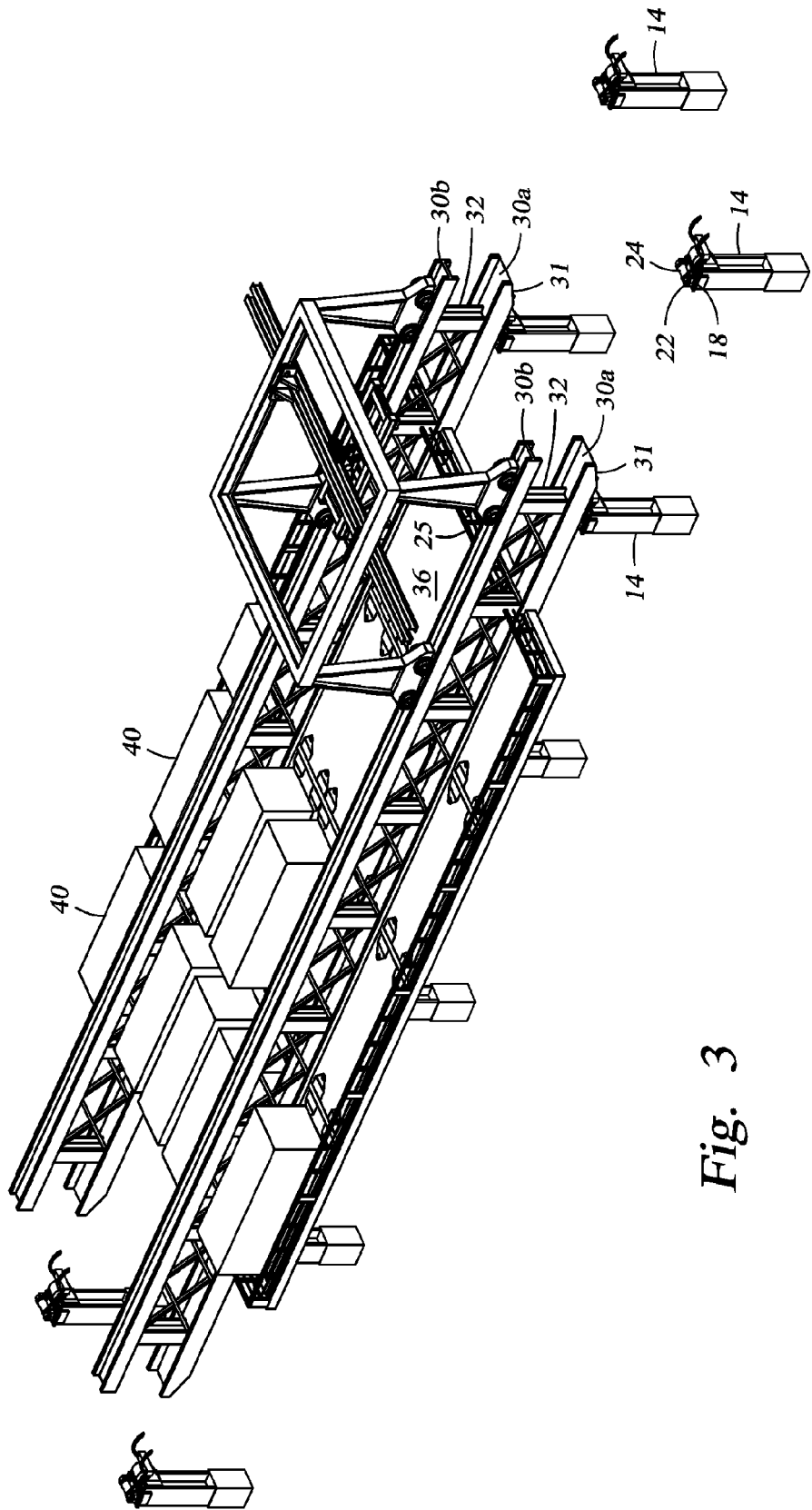
FIG. 3 is perspective view of a container utility system similar to that shown in FIG. 1.
Figure 4:
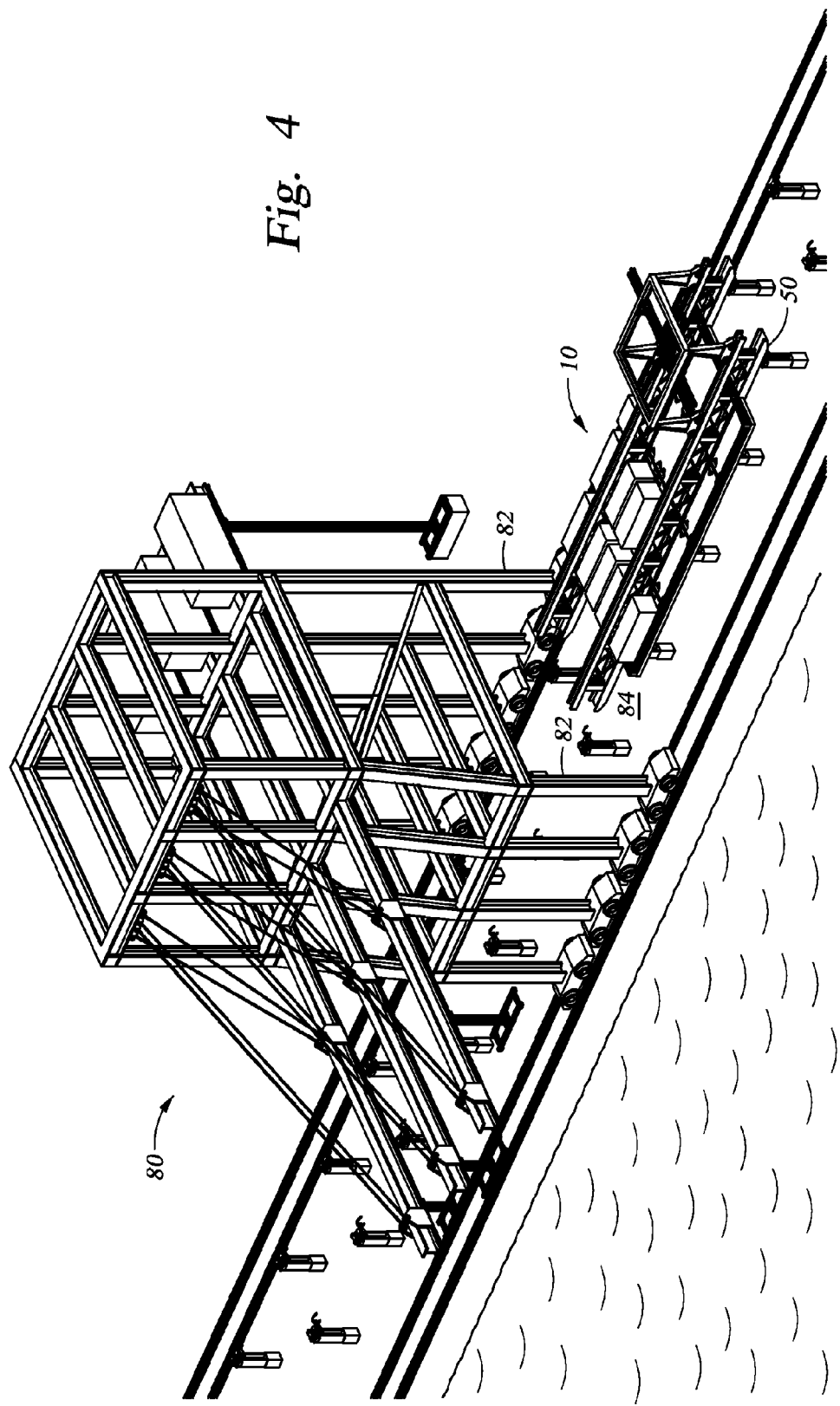
FIG. 4 is a perspective view of the container utility system of FIG. 3 with an overhead crane.
Figure 5:
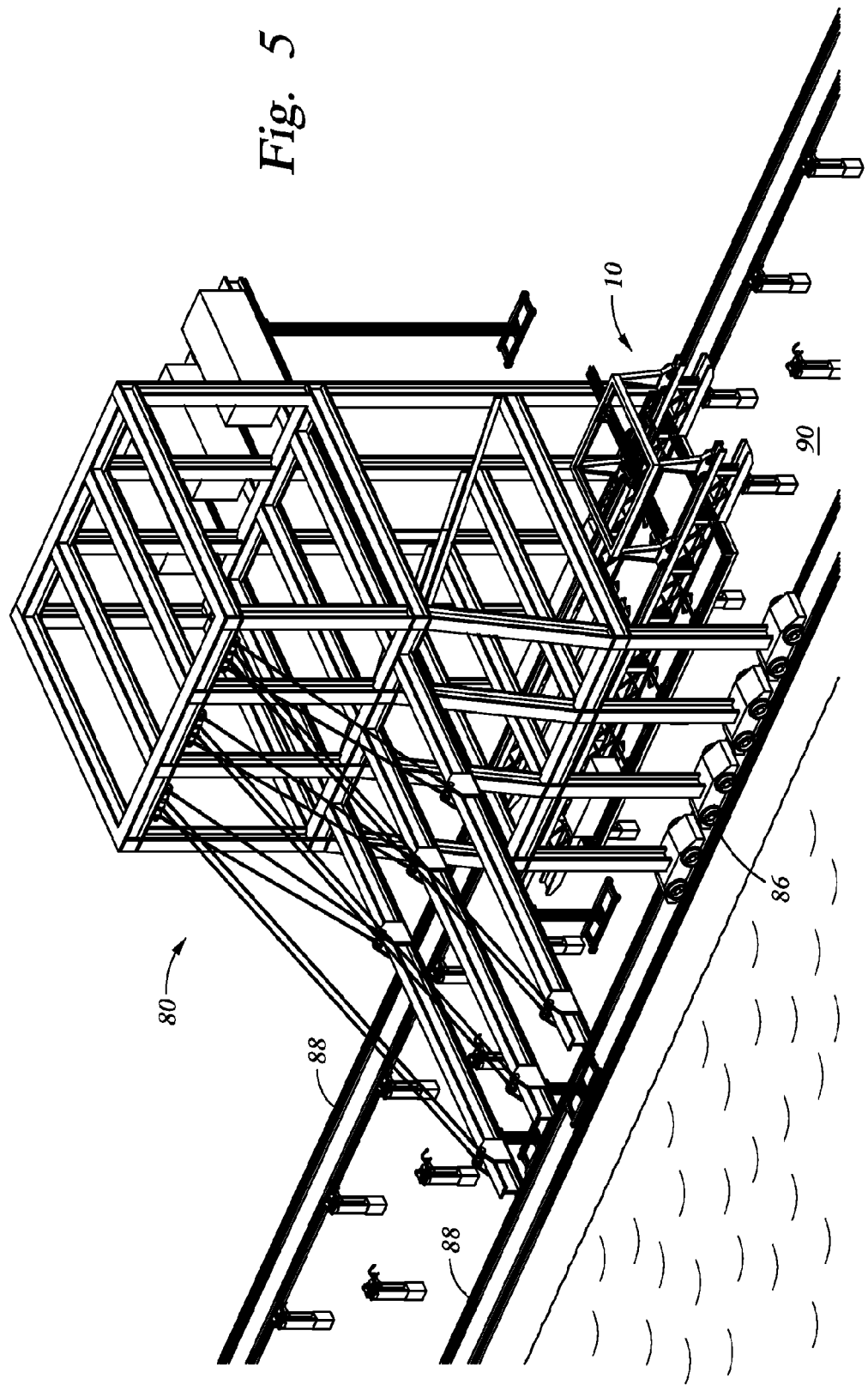
FIG. 5 is another perspective view of the container utility system of FIG. 4.
Figure 6:
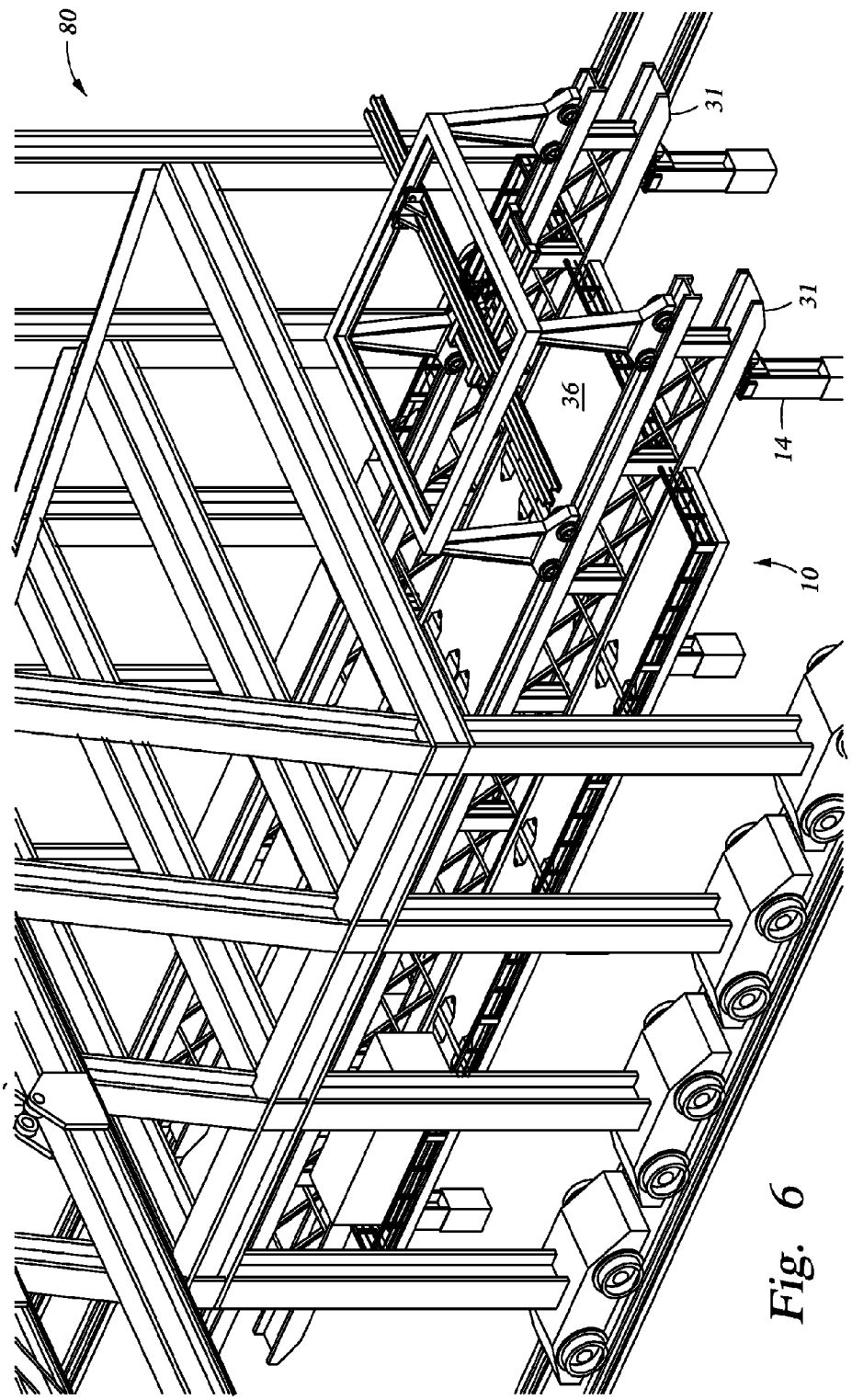
FIG. 6 is still another perspective view of the container utility system of FIG. 4.

The support system 12 includes a plurality of structural supports 14 arranged in parallel pairs to define a route of travel of the transport 20 along a predetermined course at a predetermined elevated height. Each support 14 is anchored into the ground 16 such as by pile driving and concrete and may be made of steel. As shown in FIG. 3, each support 14 has a cap 18 with an axle yoke 22 rotatably supporting a roller 24, best shown in FIG. 1A. The entire transport 20 rests on support system 12 such that the supports 14 are robust and preferably are individual stationary columns or pillars.

The transport 20 includes a body 26 formed by a parallel pair of longitudinal beams 30 and a plurality of cross members 34 attaching the parallel beams 30. The beams 30 may be large solid structural beams such as that shown in FIG. 1 or may be made up of an upper and lower beam 30b, 30a with vertical cross beams 32 extending in between beams 30a, 30b. Cross members 34 may be cantilevered and extend between and past the beams 30 to provide structural rigidity. Beams 30 and members 34 may be of various sizes (lengths) to accommodate local conditions, as for example local port layouts and wharf crane dimensions. The lower ends of the beams 30 are tapered at 31.

The transport 20 may have a flat floor, webbing, or individual stop/supports. The body 26 may include flooring or a deck 36, best shown in FIG. 6, or merely webbing extending between the beams 30. Although a side rail 25 is shown in FIGS. 3-6, such a side rail is not necessary on the transport 20.

Figure 2:
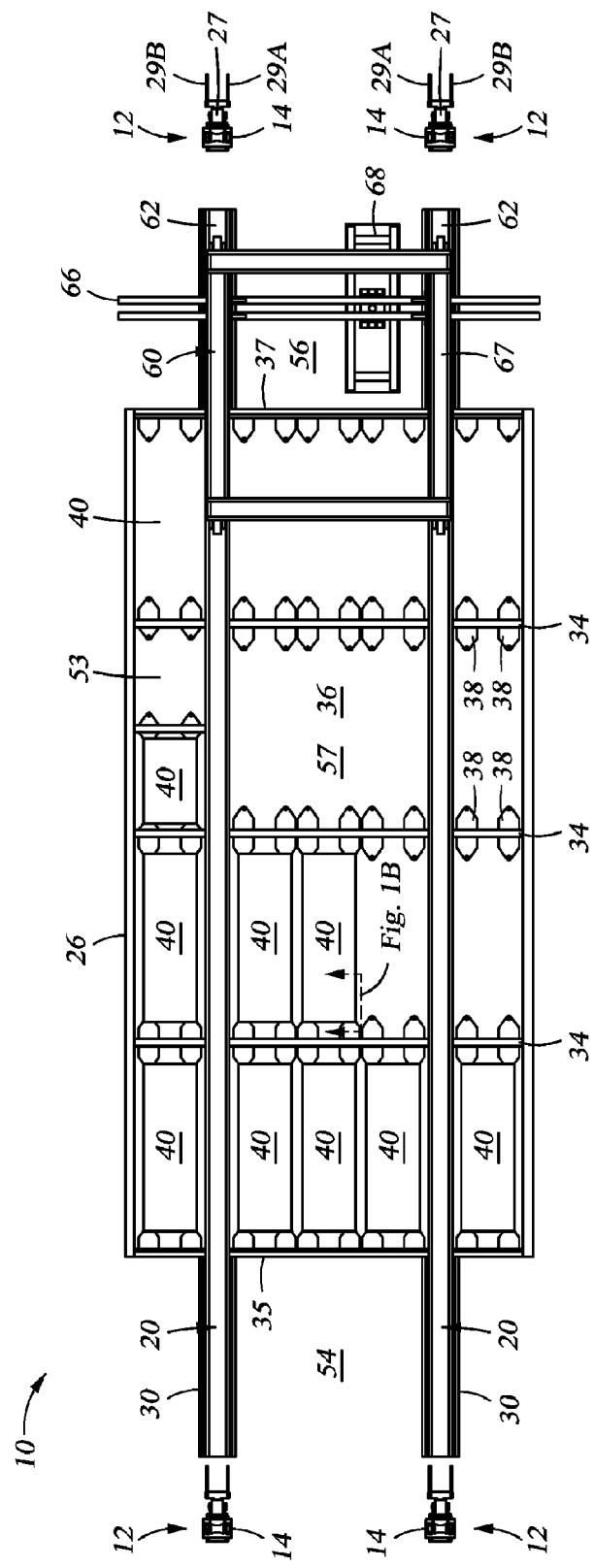
FIG. 2 is a top view of the container port utility system of FIG. 1.
Figure 7:
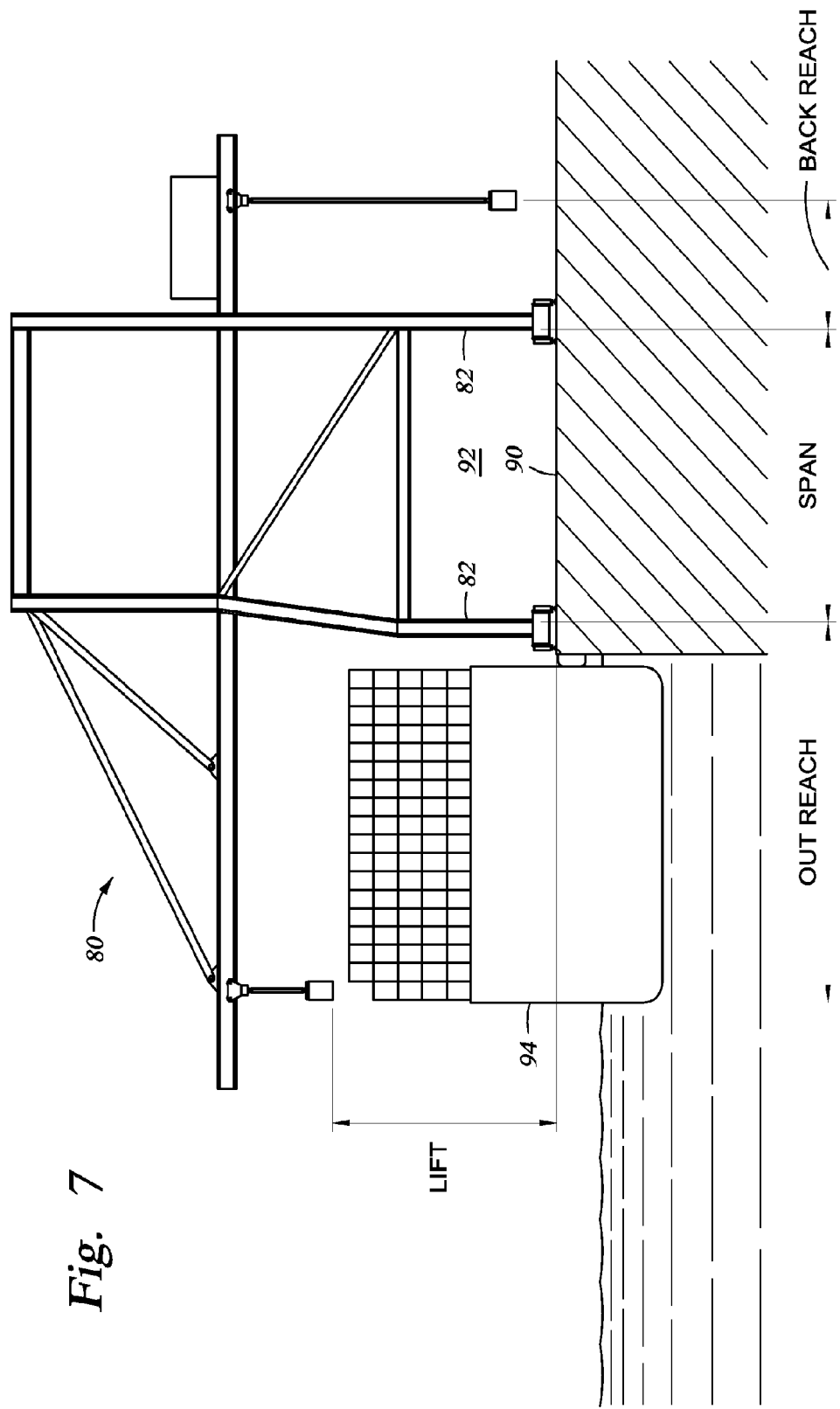
FIG. 7 is a schematic showing typical dimensions for a container utility system with a port crane.

Containers 40, such as shown in FIGS. 2 and 3, are used to transport cargo on vessels, such as vessel 94 shown in FIG. 7, and vehicles and typically have predetermined dimensions such as either a standard 20 foot length or a 40 foot length with a common width. Also as shown in FIG. 1B, receptacles 42 are placed at predetermined locations on each container 40, such as at the corners of the container 40, both on the top and bottom of the container 40. These receptacles 42 provide means to releasably connect the container 40 to transport 20 to move the container 40 from one location to another.

The transport 20 need not have any flooring and may include suitable carrying shelves or stops 38, best shown in FIG. 1B, for supporting cargo containers 40. The stops 38 are attached to the beams 30 and/or cross members 34 and are capable of supporting the weight of the containers 40 which are placed on transport 20. The stops 38 are disposed on transport 20 between the beams 30 and optionally beyond the beams 30 so that they can be aligned with receptacles 42 on containers 40. The container stops 38 may be located exteriorly on that portion of the members 34 extending on each side of the transport 20 or may be located inside the beams 30 to mount the containers 40 interiorly of the beams 30. Further, the stops 38 may be disposed on transport 20 to support either 20 foot containers or 40 foot containers. Also two 20 foot containers may be supported between the adjacent cantilever members 34 in place of a 40 foot container such as at 53.

The stops 38 support the container 40 and are locked inside the receptacle 42 once the container 40 is in place. The knob on the top of the stop 38 turns 90° to lock within the receptacle 42 of the container 40. The receptacles 42 of each container are aligned with a stop 38 such that the receptacle 42 receives a stop 38 which is then locked in place within the receptacle 42. It is preferred that the transport 20 is open using multiple stop/supports 38 for the containers 40.

Best shown in FIGS. 1A and 2, suitable rails 50 are mounted on the underside of the two large structural beams 30 of transport 20 to engage rollers 24 for rolling support on the top of supports 14. It should be appreciated that the lower rails 50 may be an integral part of beam 30. The large steel rollers 24 are mounted on axle yokes 22 so that the rails 50 of transport 20 may ride on rollers 24. The rollers 24 and rails 50 are of geometry to maintain alignment of the transport 20 in the preferred direction of travel. Preferably the rails 50 and rollers 24 have conforming arcuate surfaces 52 to help maintain the rails 50 in place on the rollers 24 and thus the supports 14.

The transport 20 is moved by rotating rollers 50, such that the frictional engagement of rollers 24 with rails 50 causes transports 20 to move on support system 12. The rollers 24 are rotated by a suitable power mechanism, such as a motor 27, mounted on support 14. The electrical motors 27 are mounted in the column supports and may derive their electrical power from a generator 33 onboard the transport 20 or from a fixed land based electrical source 29. The rollers 24 are preferably powered from the transport 20. Transport 20 preferably includes onboard power 51 such as diesel power, to provide motive power for the motors 27 to rotate rollers 24 and thus in effect drive the transport 20 forward or backward on support system 12. The onboard power 51 could be housed in one of the containers 40 and may be a diesel generator. The electrical system of the motors 27 for the rollers 24 is then connected to the diesel generator in the container 40.

One method is to electrify the rails 50 so that when they engage the rollers 24, electricity flows from the diesel motor/generator 51 to the rollers 24 to thereby provide power to the electric motor 27 and the support to drive the rollers 24.

The rollers 24 could be powered using onboard power looped through the rollers 24 to the motor 27 so that the onboard power drove the rollers 24. This eliminates the cost of an electrical system.

Alternatively the onboard power 51 could provide electricity to a contact point 39 which engages the supports 14 to provide power to the motor for the rollers 24 to thereby drive the rollers. See for example FIG. 1A showing contact points 39A and 39 B electrically engaging electrical power source 29A and 29B.

Onboard diesel power is optional. It should be appreciated that power for the motors 27 may be supplied by a power source provided on the ground or wharf. Power conduits would extend from the power source to the individual supports 14. An electrical system in the supports 14 that for the motors 27 may be less desirable since it may necessitate reconstructing the pier to add electrical conduits for the rollers 24.

Referring again to FIG. 2, the ends 55 of the beams 30 project from transport 20 to form a cantilevered portion and produce a cantilever effect at the front and back of the transport 20 as the beams 30 extend past the last engaged rollers 24. These front and back areas of the transport 20 form fore and aft open bays 54, 56 at the front and back ends of the transport 20. These open bays 54, 56 are defined by the area of the transport 20 fore and aft of the first and last cross beams 35, 37. It should be appreciated that there are intermediate bays 57, which may be open or have a floor 36.

If the spacing of the columns or supports 14 is uniform as to the long axis of the transport 20 and the spacing does not exceed 50% of the length of the transport 20, and the mass of the transport 20 is uniform throughout, then the transport 20 will not tip as it moves from one pair of support rollers 24 to the next. For example, in theory, if the transport 20 were 301 feet long, then theoretically the maximum extension of the ends of beams 30 would be 150 feet. At a minimum at least four columns 14 are needed to support the transport 20, two supporting each underside rail 50.

As a practical matter the spacing must be shorter due to possible deflection and/or varied loading of the cantilevered portion. It is anticipated the spacing will in fact be related to the length of the container 40 and that the optimum spacing will be 60 feet. This means that a transport 20 with an overall length of 301 feet will rest on five pairs of rollers 24 and briefly on six pairs at a 60 foot spacing.

It is undesirable to have weight on each end of the transport 20 which might cause it to bend or deflect. Once the end of the transport 20 moves off a pair of rollers 24, if there is too much weight at the end of the transport 20, it may deflect prior to engaging the next adjacent pair of rollers 24. As a practical matter the spacing must be shorter due to possible deflection of the cantilevered portion of the beams 30.

The horizontal beams 30 extend in a cantilever fashion creating fore and aft bays 54, 56 with cross members 35, 37. The beams 30 extend at least the length of the containers 40 to allow containers 40 to pass through the open bays 54, 56. The open fore and aft bays 54, 56 provide weight distribution. The fore and aft bays 54, 56 of the transport 20 are also open so that containers 40 can be loaded and unloaded by passing the containers down through the fore and aft bays 54, 56.

The transport 20 may be adapted to accommodate an overhead crane or other container loader/unloader 60. The fore and aft bays 54, 56 are left open so that the traveling onboard loader/unloader 60 may self load or unload the transport 20 to the ground, pier or waiting truck or train below. The loader/unloader 60 includes a frame 64 having longitudinal members 65 and cross members 67 and a mechanism 75 for grasping and releasing cargo containers 40. A support beam 66 is mounted perpendicular to the longitudinal members 65 to movably support a set of container hooks 70 on a support member 68. The hooks 70 may be raised or lowered such as by cable, to connect and disconnect with a container 40.

To accommodate loader/unloader 60 on transport 20, an upper rail 62 is placed along the top of each of the horizontal beams 30 extending to the ends of beams 30 adjacent to bays 54, 56. The additional rails 62 run the length of the beams 30. This allows the loader/unloader 60 to travel over the bays 54, 56, 57 to load or unload the containers 40 either through or into the bays. The loader/unloader 60 includes plurality of support axles 72 having wheels 74. Wheels 74 are preferably steel wheels engaging track 62. However it should be appreciated that wheels 74 could be rubber wheels traveling in a U-shaped track on beams 30. Rubber wheels allow the loader/unloader 60 to travel on the ground once removed from transport 20. The loader/unloader 60 is then mounted on top of the two horizontal beams 30 so that the wheels 74 may engage upper rails 62. The rails 62 and wheels 74 allow the loader/unloader 60 to travel the length of the transport 20 and the transport 20 provides sufficient height to move containers about the transport 20 including any containers 40 that are outboard of the beams 30. The loader/unloader 60 is removable from the transport 20 and does not need to be in place all of the time. It is optional.

The hooks 70 of the loader/unloader 60 engage the corners of the container 40 such as at the receptacles 42 at the top of the container 40. The hooks 70 are similar to the stops 38 in that they line up with the receptacles 42 on the top of the container 40 and are rotated 90° to attach and lock the loader/unloader 60 to the container 40. The hooks 70 include latches that have a spring to cause them to lock. They are manually released. It should be appreciated that hooks 70 and receptacles 42 are know to those skilled in the art. The loader/ unloader 60 is used to load and unload the containers 40 onto and off of the transport 20 using the fore and aft bays 54, 56. The fore and aft bays 54, 56 could be used by the loader/unloader 60 for moving the cargo containers 40 from the ground through the bays 54, 56 and onto or off the transport 20.

The route of the transport 20 will be relatively straight unless directional changes are accommodated by a roundhouse or a transfer table device. Elevation changes may be accomplished by gradually increasing or decreasing the height of the rollers 24 within the boundaries of the flexing capabilities of the structural steel beams 30.

Referring now to FIGS. 4-7, although a variety of applications and locations may be considered for the installation of the container utility system 10, a most useful application is parallel to a wharf and operating in the air space 92 under a gantry crane or other large container crane 80. The support system 12 would extend below and between the legs 82 of the crane 80 while maintaining a high enough vertical clearance for the trucks and trains to pass beneath transport 20 at 84. Most of these cranes 80 are designed with dimensions that will allow this to occur as shown in FIG. 7.

The cantilever crane 80 also includes wheels 86 that are mounted on rails 88 extending along the wharf 90. The cantilever crane 80 is a standard container crane with a standard cross bracing height of 13 meters. See the MI-JACK "Container On Barge Solutions" brochure and the "Travelift Bridge Solutions" brochure attached and hereby incorporated herein by reference.

Crane 80 may be used to load and unload the containers 40 onto and off of the transport 20 using the bays 54, 56, 57. The bays 54, 56, 57 could be used by the gantry crane 80 for moving the cargo containers 40 from the ground through the bays 54, 56, 57.

It is an objective to minimize any movement of the crane 80. Procedures are used in loading and unloading cargo containers so as to avoid moving crane 80. Thus the transport 20 may be positioned under crane 80 at various positions and is very slow moving so that it can be accurately positioned underneath crane 80 for the loading and unloading of containers 40.

It is anticipated that the container utility system 10 will yield a transport 20 capable of carrying 50 twenty foot equivalent containers 40 or 25 forty foot containers 40 with a minimum of labor or pollution and not increasing ground level congestion and having the capability to self load/unload at the terminal or beyond.

U.S. Provisional Application, Ser. No. 60/895,507, filed Mar. 19, 2007 entitled Container Utility System is hereby incorporated herein by reference.

Although the system is designed for containerized cargo, adaptations may occur for other types of cargo, such as oversized cargo.

While a preferred embodiment of the invention has been shown and described, modifications thereof can be made by one skilled in the art without departing from the spirit of the invention.

The invention claimed is:

1. A transport system for moving cargo containers comprising:
   a plurality of elevated supports having powered rollers;
   a transport having rail engaging the powered rollers, the elevated supports being elevated to a height that allows a vehicle to pass underneath the transport;
   wherein the transport includes parallel pairs of longitudinal members for supporting a plurality of the containers, each parallel pair of longitudinal members having an upper member disposed above a lower member;
   a plurality of cross members extending between the lower members and including container supports to support the plurality of containers between the parallel pairs of longitudinal members with an upper end of the containers being adjacent the upper members; and
   a motor for moving the transport and plurality of the containers over the elevated supports;
   wherein the parallel pairs of longitudinal members include cantilevered portions extending past the last fore and aft cross members;
   wherein at least a first pair of supports of the plurality of supports is spaced a distance from an adjacent second pair of supports of the plurality of supports, wherein the cantilevered portions are cantilevered from the transport on the first pair of supports to the adjacent second pair of supports whereby the cantilevered portions contact the rollers of the second pair of supports prior to the transport traveling to the second pair of supports to transfer weight to the second pair of supports.

2. The transport system of claim 1 wherein each of the elevated supports is independent of the other elevated supports and without any structural members spanning between adjacent supports.

3. The transport system of claim 1 wherein each of the parallel pairs of longitudinal members includes a cantilever portion that extends past first and last cross members, wherein the cantilevered portions are configured to engage successive rollers on the independent supports to support the weight of the transport.

4. The transport system of claim 1 wherein the parallel pairs of longitudinal members and cross members form a plurality of bays, each bay having an open area sized to allow the cargo containers to pass vertically therethrough to the vehicle underneath the transport.

5. The transport system of claim 1 wherein the transport includes releasable connection means for connecting the containers to the lower member of the transport.

6. The transport system of claim 1 wherein the rails are disposed on the parallel longitudinal members to support the plurality of cargo containers.

7. The transport system of claim 1 wherein the rollers and rails include a conforming curved geometric surface to maintain alignment.

8. The transport system of claim 7 wherein the geometric surface is a conforming arcuate surface.

9. The transport system of claim 1 further including power means disposed on the transport to power the rollers.

10. The transport system of claim 1 wherein the cantilevered portions have a length that prevents deflection of the transport prior to engaging the next adjacent rollers.

11. The transport system of claim 1 further including an open bay extending through the transport and a loader/unloader movably disposed on the upper members of the transport adapted to pass at least one of the plurality of cargo containers through the open bay to the vehicle underneath the transport.

12. The transport system of 11 wherein the unloader/loader includes wheels that engage a track disposed on the upper members of the parallel pairs of longitudinal members cantilevered from each end of the transport.

13. The transport system of claim 11 wherein the loader/unloader includes means for releasably connecting the loader/unloader to releasable connections on top of the containers.

14. The transport system of claim 12 wherein the track is U-shaped.

15. A cargo container transport system for moving cargo containers, the system comprising:
- a plurality of elevated supports having powered rollers, the elevated supports being elevated to a height that would allow a vehicle to pass underneath a transport supported by the elevated supports;
- wherein each of the elevated supports is independent of the other supports and without any structural members spanning between adjacent supports;
- wherein the transport includes parallel pairs of longitudinal beams, each parallel pair of longitudinal beams having an upper member and a lower member, wherein each lower member has a rail engaging a plurality of the powered rollers, and wherein the transport includes a plurality of cross members extending between the lower members and cantilevered from the longitudinal beams;
- wherein the longitudinal beams and cross members define a plurality of bays for the passage of the cargo containers between the upper members;
- a loader/unloader movably mounted on the longitudinal beams for loading and unloading the containers in at least one of the bays, the upper members having tracks engaging wheels on the loader/unloader; and
- power means for rotating the rollers to move the transport and loader/unloader over the elevated supports.

16. The cargo container transport system of claim 15 wherein the parallel pairs of longitudinal beams include cantilevered portions extending past the last fore and aft cross members; and wherein the wheels of the loader/unloader are movable over tracks disposed on the cantilevered portions.

* * * * *